Figure 1:
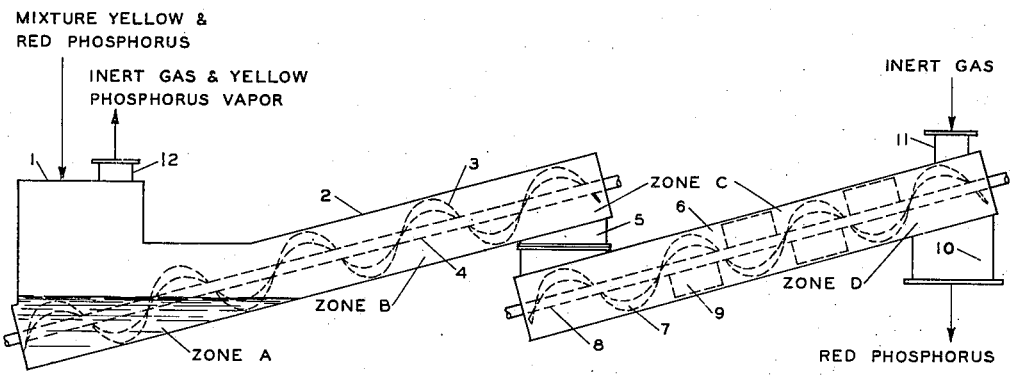

July 19, 1949.   J. R. TUSSON   2,476,335

PURIFICATION OF RED PHOSPHORUS

Filed Nov. 23, 1946

John R. Tusson
INVENTOR

BY *Arthur L. Davis*
ATTORNEY

Patented July 19, 1949

2,476,335

UNITED STATES PATENT OFFICE 2,476,335

PURIFICATION OF RED PHOSPHORUS

John R. Tusson, Princeton, N. J., assignor to Tennessee Valley Authority, a corporation of the United States Application November 23, 1946, Serial No. 711,925

3 Claims. (Cl. 23—223)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the preparation of red phosphorus and, more especially, the separation and purification of red phosphorus from a mixture of red and yellow phosphorus.

Yellow phosphorus may be fed continuously into a converter and a fluid mixture of red and yellow phosphorus withdrawn continuously therefrom. Several methods have been proposed for the separation of red phosphorus from the yellow phosphorus in such a mixture including the vaporization of yellow phosphorus at atmospheric pressure, the vaporization of yellow phosphorus in a vacuum, the vaporization of yellow phosphorus with steam, and the extraction of yellow phosphorus with a suitable solvent. Of these various methods, the process involving the vaporization of yellow phosphorus at atmospheric pressure is generally the most satisfactory. The other vaporization methods require costly and relatively complicated apparatus, while the solvent extraction method is not economical in view of the large proportion of yellow phosphorus present in the fluid mixture being processed. With the operation of these methods of separation of red phosphorus from yellow phosphorus disclosed in the prior art, a reasonably good separation of yellow phosphorus is obtained but is not sufficiently complete to render the red phosphorus so prepared free from spontaneous ignition when it comes in contact with air.

The principal object of the present invention is to provide a process for the separation and purification of red phosphorus contained in a mixture of red and yellow phosphorus which will result in the production of red phosphorus of such a degree of purity in respect to yellow phosphorus content that it will not spontaneously ignite in air at atmospheric temperatures. Another object of this invention is to provide a process for such separation and purification which may be carried out economically and continuously. Other objects of this invention include the provision of certain improvements in apparatus for carrying out the methods indicated in the foregoing objects.

The present invention is directed to a method for the production of red phosphorus substantially free from yellow phosphorus from a fluent mixture of red phosphorus and yellow phosphorus obtained by thermal treatment of yellow phosphorus by continuously forming a thin layer of said fluent mixture of yellow and red phosphorus in an elongated zone maintained under conditions of pressure and temperature such that yellow phosphorus therein is vaporized, by advancing said film through said zone wherein the fluent mixture is converted into agglomerated masses of red phosphorus and yellow phosphorus, by disintegrating such agglomerated masses, and by advancing the disintegrated material through said zone until substantially all of the yellow phosphorus is removed therefrom. The present invention also includes an improvement in the apparatus for disintegrating agglomerated masses of red phosphorus by a combination of apparatus elements which includes a means for abrading the agglomerated material as it is being conveyed through the purification apparatus.

Figure 2:
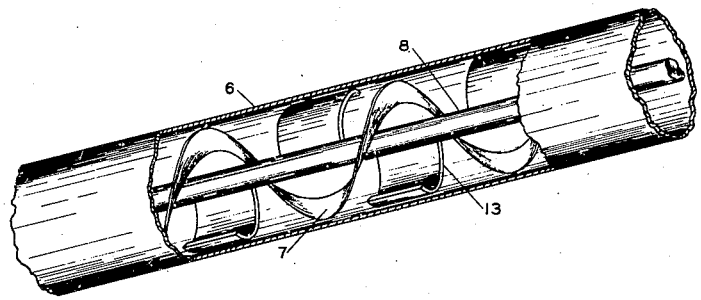
Figure 3:
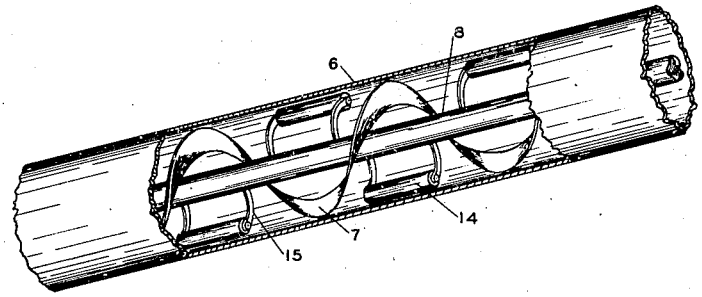

In the accompanying drawings which form a part of the specification, and wherein reference symbols refer to like parts wherever they occur, Fig. 1 is a diagrammatic, vertical view of one form of apparatus for the embodiment of the present invention, Fig. 2 is a part-sectional, perspective view of a part of the apparatus shown in Fig. 1, showing in somewhat more detail the curved plates incorporated in the screw conveyer for crushing lumps of red phosphorus, and Fig. 3 is an alternate form of the apparatus shown in Fig. 2 wherein rollers are incorporated for crushing lumps of red phosphorus.

In Fig. 1, chamber 1 communicates with the lower end of inclined cylindrical conveyer shell 2 through which ribbon flights 3, mounted on shaft 4, convey material upwardly through shell 2. The lower portion and the upper portion within said shell 2 is further identified as zone A and zone B respectively. In order to avoid use of internal bearings or hangers inside a single screw conveyer of considerable length, two separate conveyers are used. A gas-tight chamber 5 connects the upper end of shell 2 to the lower end of a second inclined cylindrical conveyer shell 6, through which passes ribbon flights 7 mounted on shaft 8. Agglomerated material passing upwardly through shell 6 is crushed by abrading means 9 mounted on shaft 8 and bearing on the interior of shell 6. The lower portion and the upper portion within said shell 6 is further identified as zone C and zone D respectively. Material reaching the upper end of shell 6 is delivered to gas-tight receiving chamber 10 from which it may be continuously or periodically discharged. A gaseous atmosphere, inert in respect to yellow phosphorus, is admitted through inlet 11 at the upper end of shell 6 and discharged from outlet 12 to chamber 1. The exterior of both shell 1 and shell 6 is heated electrically or with steam by means not shown.

In the operation of the apparatus shown in Fig. 1, the entire apparatus is filled with an inert gas which is then passed continuously therethrough. The temperature of all zones therein is raised to at least 280° C., with the temperature in zone A and zone B being preferably up to about 340° C. and such temperatures maintained throughout the separation of the yellow from red phosphorus. A slurry of molten yellow phosphorus and solid particles of red phosphorus, at a temperature of approximately 280° C., is fed into chamber 1 from which it passes and accumulates in zone A of shell 2. The ribbon flights 3 agitate the mixture in zone A and continuously convey a portion of the mixture into and through zone B. As the mixture passes through chamber 5 into zone C it is of such consistency that it readily agglomerates to form lumps of red phosphorus and entrapped molten yellow phosphorus. As the agglomerated material passes through conveyer shell 6, the agglomerated lumps are crushed by abrading means 9 bearing against the inside walls of conveyer shell 6. By the time the material reaches zone D substantially all of the yellow phosphorus has been removed so that the product discharged into receiving chamber 10 will not spontaneously ignite when it subsequently comes into contact with air at atmospheric temperature.

In Fig. 2, the cylindrical, inclined conveyer shell 6 has an axial shaft 8 on which are mounted ribbon flights 7 and curved breaker plates 13. These plates bear against the inner walls of the conveyer shell 6 with a force sufficient to break up lumps of the material handled, but not sufficient to fracture the individual particles of red phosphorus which is very important in respect to the preparation of a final product of desired characteristics.

In Fig. 3, the cylindrical, inclined conveyer shell 6 has an axial shaft 8, which in addition to carrying ribbon flight 7, actuates rollers 14 which bear against the inner walls of conveyer 6 by a suitable spring mechanism 15 attached to said shaft 8.

An example of the operation of the process and apparatus of the present invention is given as compared with separation and purification wherein the agglomerated particles of red phosphorus are not abraded to permit the liberation of yellow phosphorus therefrom.

During one twenty-four hour period prior to incorporation of crushing means, the red phosphorus content of the feed to the first screw conveyer averaged 35 per cent. The product discharged from the second screw conveyer during this period contained as much as 15 per cent yellow phosphorus, averaging 11 per cent. Samples of this product, when exposed to the air, burst into flame. The temperature of the shell of the first screw conveyer averaged 344° C., and the temperature of the shell of the second conveyer averaged 288° C. The temperature of the carbon monoxide used as the inert gas averaged 316° C. at the gas inlet.

Abrading means in the form of curved plates were then mounted on the shaft of the second conveyer and bearing on the interior wall of the second conveyer shell. In an operation for a twenty-four hour period in which the red phosphorus content of the feed averaged 33 per cent, the product discharged contained an average of only 120 parts per million (0.012%) of yellow phosphorus. Samples of this product were nonautoinflammable on exposure to air. Temperatures in this twenty-four hour period were of the same order as those in the earlier period.

The fluid mixture or slurry to be handled consists of molten yellow phosphorus and solid particles of red phosphorus, with the yellow phosphorus usually being present in the larger amount. In carrying out the vaporization of the yellow phosphorus from such a mixture, several features have been found to be necessary and desirable. A means of carrying away the phosphorus vapors as they are formed is necessary, and it is desirable to accomplish this by passing over the mixture a gas which will not react with the phosphorus. Good contact between the yellow phosphorus and the inert gas is necessary and may be obtained by agitation of the mixture. It is also desirable to effect a mechanical separation from the slurry of a mud in which red phosphorus is the predominant constituent.

It has been found that an inclined screw conveyer equipped with ribbon flights and a gastight, heated shell is best suited to meet the foregoing considerations. However, in tests using this equipment, agglomerates consisting of red phosphorus and entrapped molten yellow phosphorus were formed during passage of the material through the conveyer, thereby preventing vaporization of some of the yellow phosphorus. Unvaporized yellow phosphorus was present in such quantities as to make the product autoinflammable.

It was found that this could be prevented by breaking up the agglomerates as they were formed, with precautions being taken to avoid contamination of the product. The present invention performs the crushing and fulfills the other requirements in a simple and efficient manner, obviating the necessity of using a cumbersome, expensive crusher or grinder.

The crushing action is accomplished by means of curved plates or rollers attached to and revolving with the shaft of the screw conveyer, and bearing against the cylindrical inner walls of the conveyer in such a manner that the agglomerates are squeezed between said plates or rollers and said inner walls. The crushing force acting on the lumps is sufficient to completely break up the lumps, but is not great enough to crush individual particles of red phosphorus.

No appreciable conversion of yellow phosphorus to red phosphorus takes place during the separation process.

Tests conducted to determine the effect of the inlet temperature of the inert gas on the vaporization of the yellow phosphorus indicate that such temperature has no appreciable effect, temperatures as low as 27° C. having been used.

It has also been found that the temperature in the second screw conveyer shell may be less than the boiling point of white phosphorus at atmospheric pressure, 280° C. Nonautoinflammable red phosphorus has been produced with temperatures as low as 200° C. This is possible because the passage of the inert gas through the chamber lowers the partial pressure of the phosphorus vapor in the gas mixture below the vapor pressure of the liquid yellow phosphorus.

One of the advantages of the process in which yellow phosphorus is partially converted to red phosphorus with the production of a slurry of red and yellow phosphorus is that the red phosphorus particles so produced are relatively uniform and relatively large in size. This is a desirable characteristic because the presence of very fine particles tends to make the product autoinflammable. Thus in the present invention, the crushing means must be such that the individual particles are not broken up. This prevents the use of ordinary grinders or ball mills, which, in addition to production of fines, would introduce metallic impurities because of the violent impact. A very small amount of such impurities is sufficient to catalyze and accelerate oxidation of the red phosphorus.

It will be seen, therefore, that this invention may actually be carried out by the modification of certain details without departing from its spirit and scope.

I claim:

1. In a process for the production of red phosphorus wherein yelow phosphorus is heated for a time and to a temperature sufficient to convert a substantial portion of the same to red phosphorus, and yellow phosphorus is vaporized from the resulting mixture to leave a residue of red phosphorus, that improvement which comprises continuously mechanically separating a mud, consisting of solid red phosphorus in admixture with liquid yellow phosphorus, from a hot slurry of such resulting mixture; continuously passing the separated mud upward through an inclined vaporization zone comprising two portions, namely, a first portion and a second portion; maintaining the average temperature of said first portion of said zone at about 344° C.; maintaining the average temperature of said second portion of said zone in the range from 200° C. to 280° C.; continuously agitating the phosphorus mixture during its ascent through both portions of said zone; crushing substantially all aggregates in the second portion of said zone with pressure sufficient to break up said aggregates but not great enough to break up individual particles of red phosphorus; continuously introducing a stream of inert gas into the upper portion of said zone; passing said stream of inert gas downward through both portions of said zone in intimate contact with agitated phosphorus; withdrawing a stream of inert gas containing yellow phosphorus vapor from the first portion of said zone; and withdrawing coarse particles of purified, non-autoinflammable red phosphorus from the second portion of said zone.

2. In a process for the production of red phosphorus wherein yellow phosphorus is heated for a time and to a temperature sufficient to convert a substantial portion of the same to red phosphorus, and yellow phosphorus is vaporized from the resulting mixture to leave a residue of red phosphorus, that improvement which comprises continuously mechanically separating a mud, consisting of solid red phosphorus in admixture with liquid yellow phosphorus, from a hot slurry of such resulting mixture; continuously passing the separated mud upward through an inclined vaporization zone comprising two portions, namely, a first portion and a second portion; maintaining the average temperature of said first portion of said zone at about 344° C.; maintaining the average temperature of said second portion of said zone at about 200° C.; continuously agitating the phosphorus mixture during its ascent through both portions of said zone; crushing substantially all aggregates in the second portion of said zone with pressure sufficient to break up said aggregates but not great enough to break up individual particles of red phosphorus; continuously introducing a stream of inert gas at a temperature in the range from 27° to 316° C. into the upper portion of said zone; passing said stream of inert gas downward through both portions of said zone in intimate contact with agitated phosphorus; withdrawing a stream of inert gas containing yellow phosphorus vapor from the first portion of said zone; and withdrawing coarse particles of red phosphorus containing about 0.012 per cent yellow phosphorus from the second portion of said zone.

3. In a process for the production of red phosphorus wherein yellow phosphorus is heated for a time and to a temperature sufficient to convert a substantial portion of the same to red phosphorus, and yellow phosphorus is vaporized from the resulting mixture to leave a residue of red phosphorus, that improvement which comprises continuously mechanically separating a mud, consisting of solid red phosphorus in admixture with liquid yellow phosphorus, from a hot slurry of such resulting mixture containing about 33 per cent red phosphorus; continuously passing the separated mud upward through an inclined vaporization zone comprising two portions, namely, a first portion and a second portion; maintaining the average temperature of said first portion of said zone at about 344° C.; maintaining the average temperature of said second portion of said zone at about 200° C.; continuously agitating the phosphorus mixture during its ascent through both portions of said zone; crushing substantially all aggregates in the second portion of said zone with pressure sufficient to break up said aggregates but not great enough to break up individual particles of red phosphorus; continuously introducing a stream of inert gas at a temperature of about 316° C. into the upper portion of said zone; passing said stream of inert gas downward through both portions of said zone in intimate contact with agitated phosphorus; withdrawing a stream of inert gas containing yellow phosphorus vapor from the first portion of said zone; and withdrawing coarse particles of red phosphorus containing about 0.012 per cent yellow phosphorus from the second portion of said zone.

JOHN R. TUSSON.

REFERENCES CITED

The following references are of record in the file of this patent:

UNITED STATES PATENTS

| Number | Name | Date |
| --- | --- | --- |
| 1,835,279 | Carl et al. | Dec. 8, 1931 |
| 1,919,307 | Rupprecht | July 25, 1933 |
| 2,032,338 | Anderson | Feb. 25, 1936 |
| 2,135,486 | Almond | Nov. 8, 1938 |
| 2,216,371 | Leveke | Oct. 1, 1940 |
| 2,397,951 | DeWitt | Apr. 9, 1946 |

FOREIGN PATENTS

| Number | Country | Date |
| --- | --- | --- |
| 7,086 | Great Britain | 1898 |